United States Patent
Tonomura et al.

(10) Patent No.: US 9,277,599 B2
(45) Date of Patent: Mar. 1, 2016

(54) SPINNING PACK HEATING DEVICE AND MELT SPINNING APPARATUS

(71) Applicant: TOKUDEN CO., LTD., Kyoto-shi, Kyoto (JP)

(72) Inventors: Toru Tonomura, Kyoto (JP); Yasuhiro Fujimoto, Kyoto (JP)

(73) Assignee: TOKUDEN CO., LTD., Kyoto-shi (JP)

( * ) Notice: Subject to any disclaimer, the term of this patent is extended or adjusted under 35 U.S.C. 154(b) by 44 days.

(21) Appl. No.: 14/042,161

(22) Filed: Sep. 30, 2013

(65) Prior Publication Data

US 2014/0093599 A1   Apr. 3, 2014

(30) Foreign Application Priority Data

Oct. 1, 2012 (JP) ................ 2012-219080

(51) Int. Cl.
*D01D 1/04* (2006.01)
*H05B 6/14* (2006.01)
*B29C 47/86* (2006.01)
*H05B 6/36* (2006.01)

(52) U.S. Cl.
CPC ........... *H05B 6/14* (2013.01); *B29C 47/862* (2013.01); *D01D 1/04* (2013.01); *H05B 6/365* (2013.01)

(58) Field of Classification Search
CPC ............ H05B 6/14; H05B 6/365; D01D 1/04; B29C 47/862

USPC ................................................ 425/378.2
See application file for complete search history.

(56) References Cited

U.S. PATENT DOCUMENTS

| | | | | |
|---|---|---|---|---|
| 3,521,325 A | * | 7/1970 | Schippers | 425/3 |
| 5,025,124 A | * | 6/1991 | Alfredeen | 219/673 |
| 6,062,838 A | * | 5/2000 | Glawion et al. | 425/72.2 |
| 2015/0140153 A1 | * | 5/2015 | Stirling et al. | 425/174.8 R |

FOREIGN PATENT DOCUMENTS

JP      2011023251 A      3/2011

* cited by examiner

*Primary Examiner* — Yogendra Gupta
*Assistant Examiner* — Joseph Leyson
(74) *Attorney, Agent, or Firm* — Alleman Hall McCoy Russell & Tuttle LLP

(57) ABSTRACT

The present invention is one that heats the inside of the spinning pack in a short period of time while keeping temperature of an outer circumferential part of a spinning pack less than a maximum allowable temperature, and provided with: a magnetic path forming member that forms a magnetic path with a spinning pack arrangement space where the spinning pack is arranged to occupy the space and be positioned intermediate respective ends of the magnetic path forming member that border the space; and a magnetic flux generating winding that is provided so as to be wound to surround the spinning pack arrangement space.

2 Claims, 14 Drawing Sheets

SPINNING PACK HEATING DEVICE AND MELT SPINNING APPARATUS

TECHNICAL FIELD

The present invention relates to a spinning pack heating device that heats a spinning pack by induction heating, and to a melt spinning apparatus.

BACKGROUND ART

A spinning pack used to discharge and mold synthetic resin is generally preheated to near operating temperature before being attached to a melt spinning apparatus. In many cases, a preheating furnace is used to heat the spinning pack to a high temperature around 300° C.; however, it takes time to reach a desired temperature.

For this reason, as described in Patent Literature 1, it is well known that an induction coil may be wound around an outer circumferential surface of a spinning pack to raise a temperature of the spinning pack in a short period of time by induction heating.

However, in the case of winding the induction coil around the outer circumferential surface of the spinning pack, there is a problem that the temperature of an outer circumferential part of the spinning pack rapidly rises, and therefore it takes time for a temperature of the inside, in which a flow path through which molten resin passes is formed, to reach a desired temperature.

Also, in many cases, inside of the spinning pack, a filter for removing foreign substance in the molten resin is provided, and in terms of material and structure of the filter, it is desired to set a maximum allowable temperature to approximately 400° C. For this reason, in the case of performing the heating until the inside temperature reaches the desired temperature, there is a problem that the temperature around the inside exceeds the maximum allowable temperature to damage the filter.

CITATION LIST

Patent Literature

Patent Literature 1: JP-A2011-23251

SUMMARY OF INVENTION

Technical Problem

Therefore, the present invention is made in order to solve the above problems, and a main intended object thereof is to heat the inside of the spinning pack to a desired temperature in a short period of time, while keeping a temperature of a spinning pack less than a maximum allowable temperature.

Solution to Problem

Accordingly, a spinning pack heating device according to the present invention is a spinning pack heating device that preheats a spinning pack by induction heating, and provided with: a magnetic path forming member that forms a magnetic path with a spinning pack arrangement space where the spinning pack is arranged to occupy the space and be positioned intermediate respective ends of the magnetic path forming members that border the space; and a magnetic flux generating winding that is provided so as to be wound to surround the spinning pack arrangement space.

If so, magnetic flux generated by the magnetic flux generating winding passes through the magnetic path forming member to penetrate through the whole of the spinning pack, including a central part of the spinning pack, and therefore the whole of the spinning pack can be heated by eddy currents to heat the whole of the spinning pack uniformly. This enables the inside of the spinning pack to be preheated in a short period of time, while keeping the temperature of an outer circumferential part of the spinning pack less than a maximum allowable temperature. Also, the magnetic flux generating winding is provided so as to surround the spinning pack arrangement space, and therefore an induction current can be directly induced in the spinning pack to increase a circuit power factor.

Desirably, the magnetic path forming member includes a pair of magnetic path yoke cores that form three spinning pack arrangement spaces arranged at respective vertices of an equilateral triangle; for each of the three spinning pack arrangement spaces, the magnetic flux generating winding is provided; and the three magnetic flux generating windings are connected to a three-phase AC power source. If so, the three-phase AC power source can be used to simultaneously heat the three spinning packs. Also, the three spinning pack arrangement spaces are arranged in a triangular shape, so that magnetic circuit lengths of the three phases are equalized, and therefore magnetic resistances of the three phases are nearly equalized to nearly equalize the magnetic flux amounts. Accordingly, the three spinning packs can be heated nearly equally.

Desirably, the spinning pack heating device has: a leg core that is provided at a gravity center position of the equilateral triangle formed by the three spinning pack arrangement spaces and magnetically connects the paired magnetic path yoke cores to each other; and a control mechanism that individually controls currents flowing through the three magnetic flux generating windings. If so, the leg core provided at the gravity center position of the equilateral triangle serves as a leg core for leakage magnetic flux, and therefore temperature rise values and heat-up times of the spinning packs arranged in the respective spinning pack arrangement spaces can be individually controlled. Also, the number of spinning packs arranged in the three spinning pack arrangement spaces can be set to one, two, or three to perform heating. Note that a state where maximum magnetic flux flows through the leakage magnetic path appears in the case of heating one or two spinning packs, and in the case of the same input voltages, the corresponding total magnetic flux takes a value not exceeding the maximum magnetic flux of a single phase. For this reason, it is only necessary that a cross-sectional area of a transverse cross section of the leg core serving as the leakage magnetic path is made substantially the same as each of the cross-sectional areas of vertical cross sections of the yoke cores.

Desirably, the magnetic flux generating winding is a first magnetic flux generating winding, and part of the magnetic path forming member is provided with a second magnetic flux generating winding that is different from the first magnetic flux generating winding. If so, by adjusting a magnetic flux amount generated by the magnetic flux generating winding provided for the spinning pack arrangement space, and a magnetic flux amount generated by the magnetic flux generating winding provided for the magnetic path forming member, the amounts of heat generation of an outer circumferential part and central part of the spinning pack can be adjusted to perform control such that temperature differences among respective parts of the spinning pack fall inclusively within a limit.

Also, a spinning pack heating device according to the present invention is a spinning pack heating device that preheats a spinning pack by induction heating, and provided with: a magnetic path forming member that forms a magnetic path with a spinning pack arrangement space where the spinning pack is arranged to occupy the space and be positioned intermediate respective ends of the magnetic path forming member that border the space; and a magnetic flux generating winding that is provided so as to be wound around part of the magnetic path forming member, and generates magnetic flux in the spinning pack arrangement space.

If so, magnetic flux generated by the magnetic flux generating winding passes through the magnetic path forming member to penetrate through the whole, including a central part, of the spinning pack, and therefore the whole of the spinning pack can be heated by eddy currents to heat the whole of the spinning pack uniformly. This enables, while keeping temperature of an outer circumferential part of the spinning pack less than the maximum allowable temperature, the inside of the spinning pack to be preheated in a short period of time.

In the above spinning pack heating device, desirably, the magnetic path forming member has a pair of core elements that face each other to form the spinning pack arrangement space; and in order to arrange the spinning pack in the spinning pack arrangement space or detach the spinning pack from the spinning pack arrangement space, a moving mechanism that moves at least one of the paired core elements is provided. If so, attachment/detachment of the spinning pack to/from the spinning pack heating device can be facilitated.

Further, a melt spinning apparatus according to the present invention is provided with: a spinning pack having a resin inflow port into which molten resin flows and a discharge port that discharges spun yarn; a magnetic path forming member that is provided with part of the spinning pack arranged to occupy the space and be positioned intermediate respective ends of the magnetic path forming member that border the space, the part excluding the resin inflow port and the discharge port; and a magnetic flux generating winding that is provided so as to be wound around part of the magnetic path forming member.

If so, magnetic flux generated by the magnetic flux generating winding passes through the magnetic path forming member to penetrate through the whole, including a central part, of the spinning pack, and therefore the whole of the spinning pack can be heated by eddy currents to heat the whole of the spinning pack uniformly. This enables, while keeping temperature of an outer circumferential part of the spinning pack less than the maximum allowable temperature, the inside of the spinning pack to be heated in a short period of time.

Advantageous Effects of Invention

According to the present invention configured as described, the inside of the spinning pack can be heated in a short period of time while temperature of an outer circumferential part of a spinning pack is being kept less than a maximum allowable temperature.

DESCRIPTION OF THE EMBODIMENTS

Figure 1:
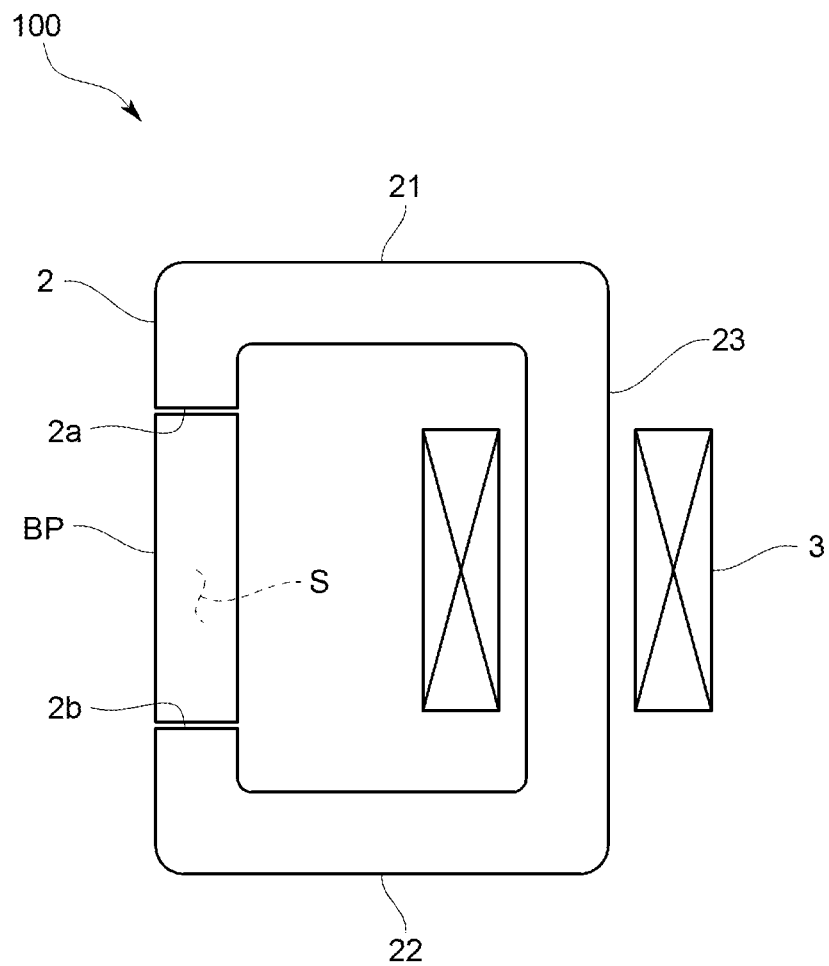
FIG. 1 is a cross-sectional view schematically illustrating a configuration of a spinning pack heating device according to a first embodiment.

In the following, one embodiment of a spinning pack heating device according to the present invention is described referring to the drawings.

(1) First Embodiment

A spinning pack heating device 100 according to a first embodiment is one that inductively heats a spinning pack BP to a desired temperature before the spinning pack BP is attached to a melt spinning apparatus.

Specifically, the spinning pack heating device 100 is, as illustrated in FIG. 1, provided with: a magnetic path forming member 2 that forms a magnetic path with a spinning pack arrangement space S where the spinning pack BP is arranged to occupy the space and be positioned intermediate respective ends of the magnetic path forming member that border the space; and a magnetic flux generating winding 3 that is provided so as to be wound around part of the magnetic path forming member 2, and generates magnetic flux in the spinning pack arrangement space S.

The magnetic path forming member 2 is one that has two surfaces 2a and 2b that are positioned opposite of each other and face each other, which form the spinning pack arrangement space S. The magnetic path forming member 2 is formed in a partially annular shape having a side view shape that is, for example, substantially C-shaped. The magnetic path forming member 2 of the present embodiment is formed of a cut core type wound core, and has: an upper core part 21 having the surface 2a; a lower core part 22 having the surface 2b; and a leg core part 23 connecting the upper core part 21 and the lower core part 22 to each other.

Also, the spinning pack arrangement space S has a size that enables the spinning pack BP to be arranged in a standing state and prevents the spinning pack BP from protruding outside from between the two opposite surfaces 2a and 2b in a state where the spinning pack BP is arranged in the spinning pack arrangement space S.

The magnetic flux generating winding 3 is provided so as to be around the part of the magnetic path forming member 2 which faces the spinning pack arrangement space S. The magnetic flux generating winding 3 of the present embodiment is provided so as to be wound around the leg core part 23 of the magnetic path forming member 2. The magnetic flux generating winding 3 is an input winding to which is applied single-phase AC voltage by an AC power source having a frequency of 50 Hz to 1000 Hz (not illustrated). In addition, the AC power source is configured with a 50 Hz or 60 Hz commercial power source or a 3N-fold (N is an odd number equal to or more than 1) frequency generator of a transformer type. An example configuration of the 3N-fold frequency generator is one that can, with primary windings of three single-phase transformers being Y-connected, and secondary windings being Δ-connected, open one end of the Δ-connection to take out a harmonic component from the opened part. As described, AC voltage having an intermediate frequency of 50 Hz to 1000 Hz is used to perform the induction heating, and therefore, as compared with the case of using a high frequency power source, power source cost can be reduced. Accordingly, the AC voltage having an intermediate frequency of 50 Hz to 1000 Hz is easily generated by wire connection of transformers, and therefore, as compared with a high frequency requiring an inverter, a significantly low cost power source can be realized.

Also, by applying the single-phase AC voltage to the magnetic flux generating winding 3, magnetic flux passes through the magnetic path forming member 2 to penetrate through the whole, including a central part, of the spinning pack BP, and therefore the whole of the spinning pack BP can be heated by eddy currents to heat the whole of the spinning pack BP uniformly.

Next, an induction heating test of the spinning pack heating device 100 of the present embodiment configured as above is described.

Figure 2A:
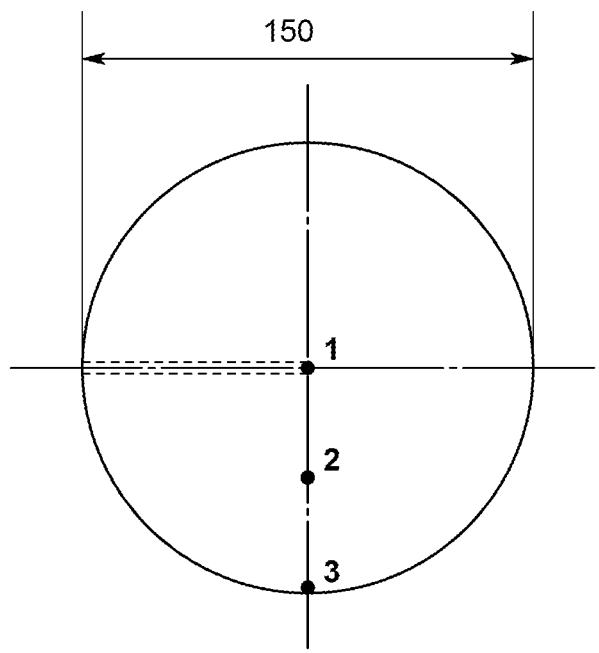
FIG. 2a is a diagram illustrating an upper end surface of a test load and temperature measuring points used for an induction heating test in respective embodiments.
Figure 2B:
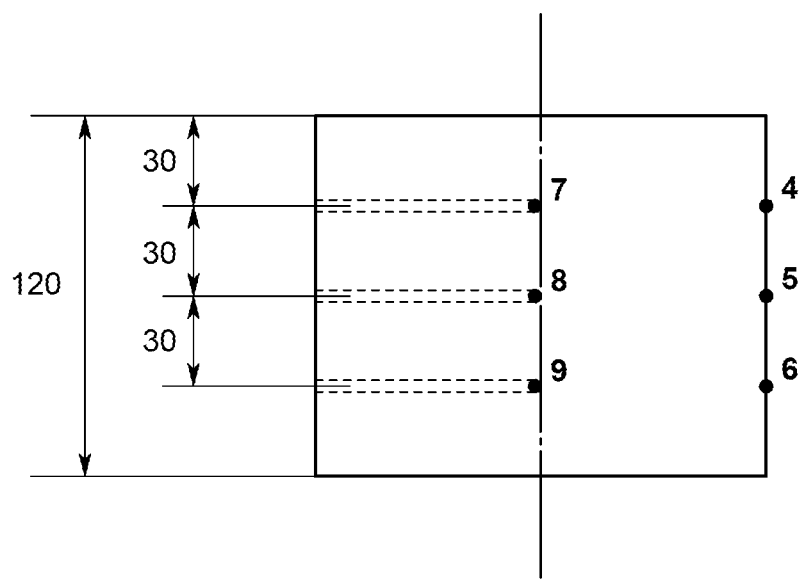
FIG. 2b is a diagram illustrating an outer circumferential surface as well as an inside portion of the test load and temperature measuring points used for an induction heating test in respective embodiments.

In addition, a test load used for the induction heating test is made of martensitic stainless steel (SUS420), and as illustrated in FIGS. 2a and 2b, a cylindrical member having a diameter of 150 mm, a height of 120 mm, and a weight of 16 kg. In the test load, three points (points 1 to 3) on an upper end surface, three points (points 4 to 6) on an outer circumferential surface, and three points (points 7 to 9) inside are set as temperature measuring points.

Figure 3:
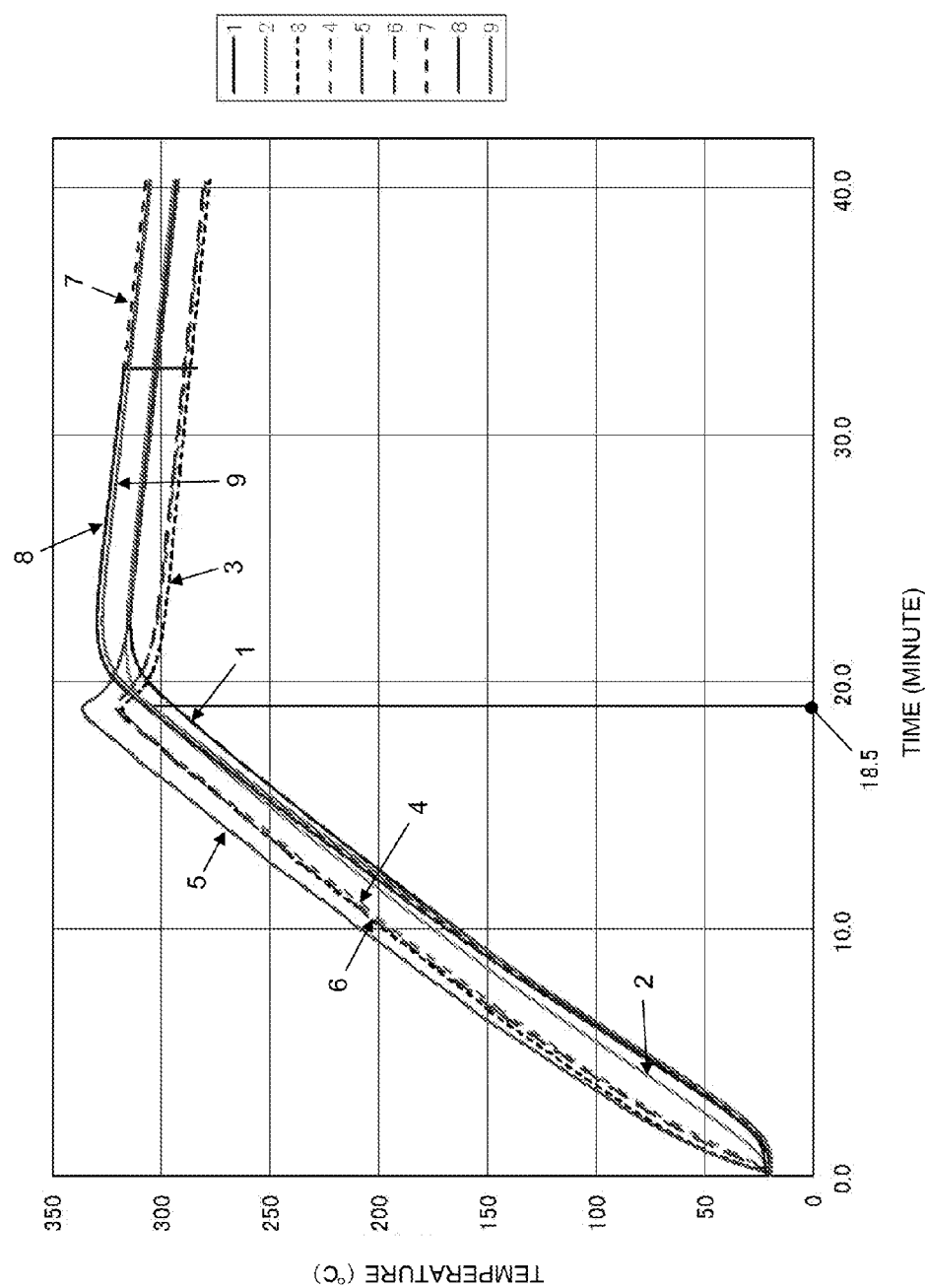
FIG. 3 is a diagram illustrating results of the induction heating test in the first embodiment.

Results of using the spinning pack heating device 100 of the present embodiment to inductively heat the test load are listed in Tables 1 and 2 below and illustrated in FIG. 3. In addition, Table 1 is a table listing changes in power factor and the like from the start; Table 2 is a table listing changes in temperatures at the respective points with time; and FIG. 3 is a graph illustrating the changes in temperatures at the respective points with time. As can be seen from Tables 1 and 2, and FIG. 3, temperatures of the central part (points 7 to 9) of the test load reach approximately 300° C. in 18.5 minutes from the start of the heating, and a difference in temperature among the respective points is 46.3° C. at a maximum. Also, at 20.2 minutes, the maximum temperature difference among the respective points is reduced to 17.0° C., and the maximum temperature difference over the entire process is kept as low as 50.4° C.

TABLE 1

| Temperature °C. | Voltage V | Current A | Capacity kW | Power factor |
|---|---|---|---|---|
| At start | 93.9 | 370.8 | 6.4 | 0.185 |
| 100 | 96.3 | 380.0 | 6.8 | 0.185 |
| 200 | 96.2 | 377.0 | 6.7 | 0.185 |
| 250 | 95.8 | 373.3 | 6.6 | 0.184 |
| 290 | 95.9 | 373.3 | 6.6 | 0.185 |

TABLE 2

| Elapsed time (minute) | Position | | | | | | | | | Temperature difference (° C.) |
|---|---|---|---|---|---|---|---|---|---|---|
| | 1 | 2 | 3 | 4 | 5 | 6 | 7 | 8 | 9 | |
| 4.0 | 63 | 76 | 106 | 99 | 111 | 101 | 62 | 65 | 60 | 50.4 |
| 18.5 | 288 | 301 | 315 | 315 | 334 | 317 | 300 | 300 | 297 | 46.3 |
| 20.2 | 308 | 315 | 306 | 311 | 323 | 310 | 322 | 322 | 319 | 17.0 |

According to the spinning pack heating device 100 of the first embodiment configured as described, the magnetic flux generated by the magnetic flux generating winding 3 passes through the magnetic path forming member 2 to penetrate through the whole, including the central part of the spinning pack BP, and therefore the whole of the spinning pack BP can be heated by the eddy currents to heat the whole of the spinning pack BP uniformly. This enables the inside of the spinning pack BP, where a flow path through which molten resin passes is formed, to be preheated in a short period of time while keeping temperatures at respective parts of the spinning pack BP less than the maximum allowable temperature.

(2) Second Embodiment

Next, a second embodiment of the present invention is described. Note that the same or corresponding members as those in the first embodiment are affixed with the same reference letters or numerals.

A spinning pack heating device 100 according to the second embodiment is different in the arrangement of magnetic flux generating winding 3 from the spinning pack heating device 100 of the first embodiment.

Figure 4:
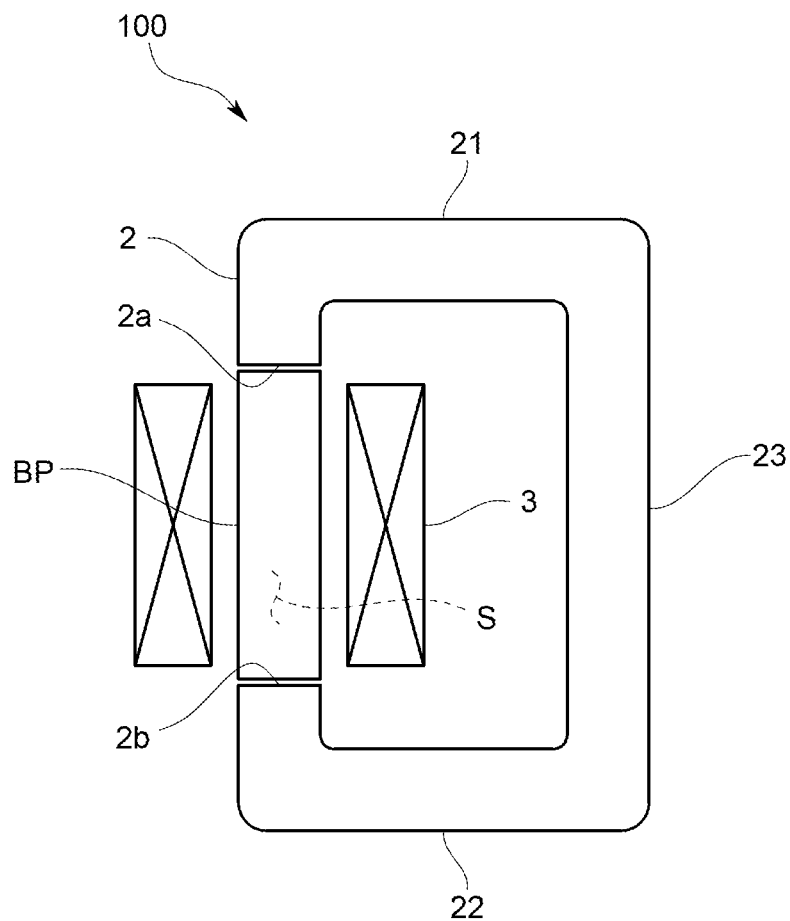
FIG. 4 is a cross-sectional view schematically illustrating a configuration of a spinning pack heating device according to a second embodiment.

The magnetic flux generating winding 3 of the present embodiment is, as illustrated in FIG. 4, provided so as to be wound to surround a spinning pack arrangement space S. A vertical winding width of the magnetic flux generating winding 3 is substantially the same as a length dimension of an outer shape of a spinning pack BP.

Also, by applying single-phase AC voltage to the magnetic flux generating winding 3, magnetic flux passes through a magnetic path forming member 2 to penetrate through the whole, including a central part, of the spinning pack BP, and therefore the whole of the spinning pack BP can be heated by eddy currents to heat the whole of the spinning pack BP uniformly. Also, the magnetic flux generating winding 3 is provided so as to surround the spinning pack arrangement space S, and therefore an induction current can be directly induced in the spinning pack BP to increase a circuit power factor.

Figure 5:
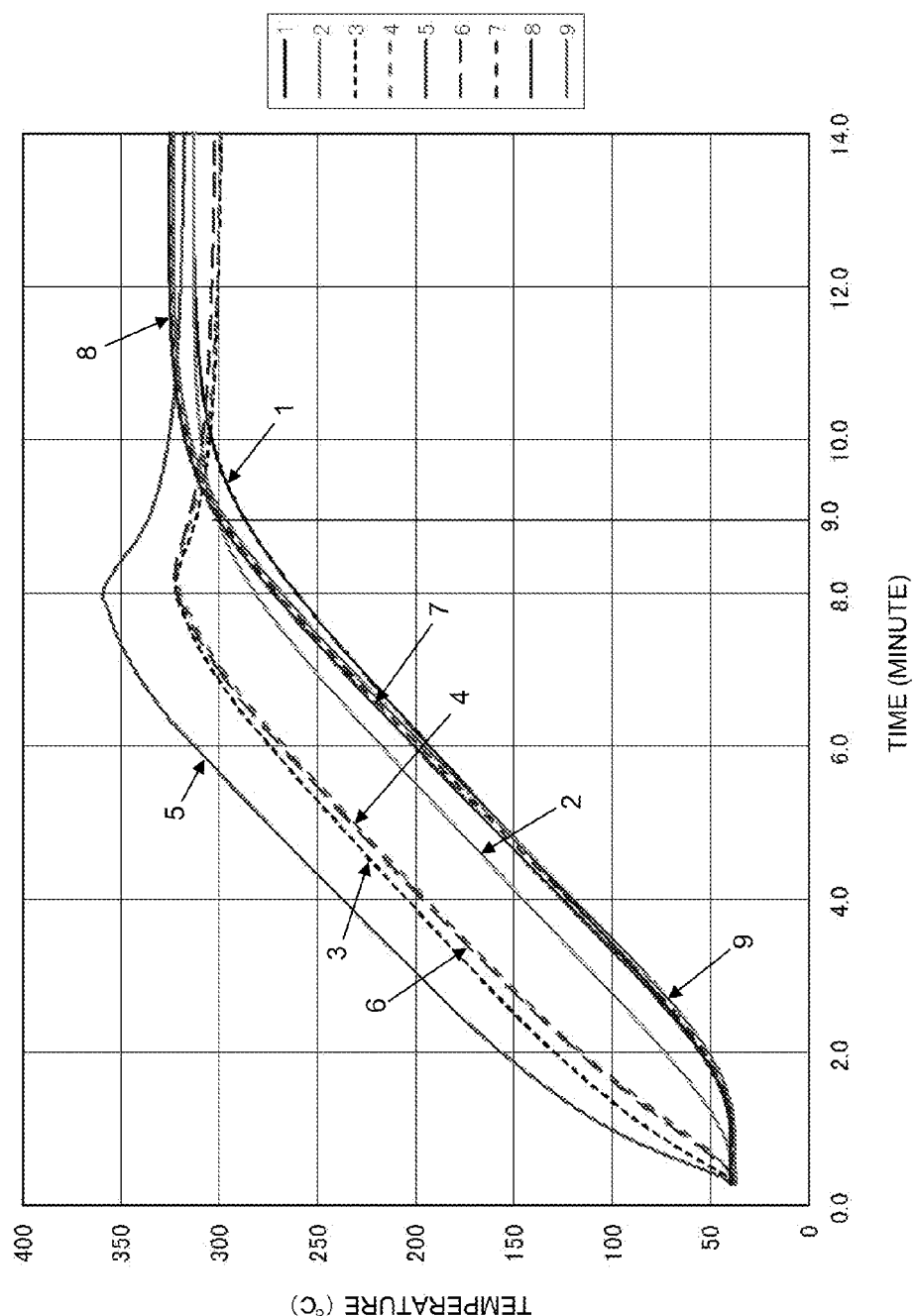
FIG. 5 is a diagram illustrating results of the induction heating test in the second embodiment.

Results of using the spinning pack heating device 100 of the present embodiment to inductively heat the test load in FIGS. 2a and 2b are listed in Tables 3 and 4 below and illustrated in FIG. 5. In addition, Table 3 is a table listing changes in the power factor and the like at the start; Table 4 is a table listing changes in temperatures at the respective points with time; and FIG. 5 is a graph illustrating the changes in temperatures at the respective points with time. As can be seen from Tables 3 and 4, and FIG. 5, as compared with the spinning pack heating device 100 of the first embodiment, the power factor is improved from 0.185 to 0.5, and a heat-up time to 300° C. is also shortened from 18.5 minutes to 9.0 minutes. In addition, a maximum temperature difference over the entire process is 120.0° C., which is larger than that in the first embodiment; however, a maximum temperature of the test load is 360° C., which does not exceed the maximum allowable temperature of 400° C.

TABLE 3

| Temperature ° C. | Voltage V | Current A | Capacity kW | Power factor |
|---|---|---|---|---|
| At start | 84.9 | 152.6 | 6.6 | 0.508 |
| 100 | 90.6 | 152.5 | 6.9 | 0.500 |
| 200 | 90.6 | 152.5 | 6.9 | 0.500 |
| 250 | 77.9 | 119.4 | 4.5 | 0.480 |

TABLE 4

| Elapsed time (minute) | Position | | | | | | | | | Temperature difference (° C.) |
|---|---|---|---|---|---|---|---|---|---|---|
| | 1 | 2 | 3 | 4 | 5 | 6 | 7 | 8 | 9 | |
| 6.3 | 204 | 228 | 284 | 277 | 324 | 279 | 210 | 212 | 207 | 120.0 |
| 9.0 | 288 | 301 | 311 | 314 | 336 | 315 | 300 | 301 | 298 | 47.8 |
| 10.7 | 309 | 312 | 303 | 304 | 323 | 306 | 321 | 322 | 320 | 19.8 |

According to the spinning pack heating device 100 of the second flux generating winding 3 passes through the magnetic path forming member 2 to penetrate through the whole, including the central part of the spinning pack BP, and therefore the whole of the spinning pack can be heated by the eddy currents to heat the whole of the spinning pack BP uniformly. This enables the inside of the spinning pack BP to be preheated in a short period of time while keeping temperature of an outer circumferential part of the spinning pack BP less than the maximum allowable temperature. Also, the magnetic flux generating winding 3 is provided so as to surround the spinning pack arrangement space S, and therefore the induction current can be directly induced in the spinning pack BP to increase the circuit power factor as compared with the first embodiment.

Figure 6:
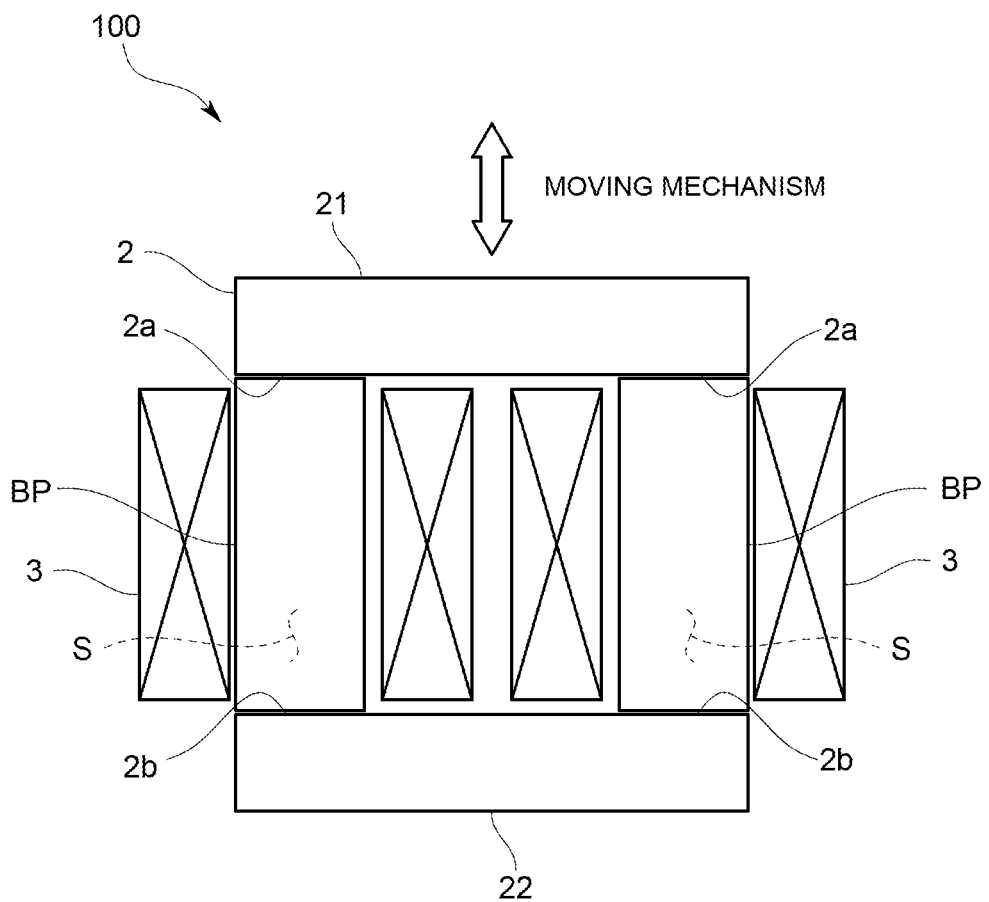
FIG. 6 is a cross-sectional view schematically illustrating a variation of the second embodiment.

Note that the second embodiment is one that heats one spinning pack BP; however, as illustrated in FIG. 6, the present invention may be configured to also form a spinning pack arrangement space S in a part corresponding to the above leg core part 23 to enable the two spinning packs BP to be simultaneously inductively heated. In this case, a moving mechanism (not illustrated) that moves one of upper and lower core parts 21 and 22 relative to the other is provided, which facilitates attachment/detachment of the spinning packs BP. In addition, as the moving mechanism, for example, one using an hydraulic mechanism is possible, which is a mechanism that manually or automatically moves the upper or lower core part 21 or 22 between a pack heating position at which the spinning packs BP intervene between the upper and lower core parts 21 and 22 and a detachment position at which the spinning packs BP can be detached. Note that the second embodiment may also be configured to be able to attach/detach the upper or lower core part 21 or 22 to/from the rest of the magnetic path forming member 2 by the moving mechanism.

(3) Third Embodiment

Next, a third embodiment of the present invention is described. Note that the same or corresponding members as those in each of the above-described embodiments are affixed with the same reference letters or numerals.

A spinning pack heating device 100 according to the third embodiment is one that can inductively heat three spinning packs BP at the same time, and different in configurations of a magnetic path forming member 2 and a magnetic flux generating winding 3.

Figure 7A:
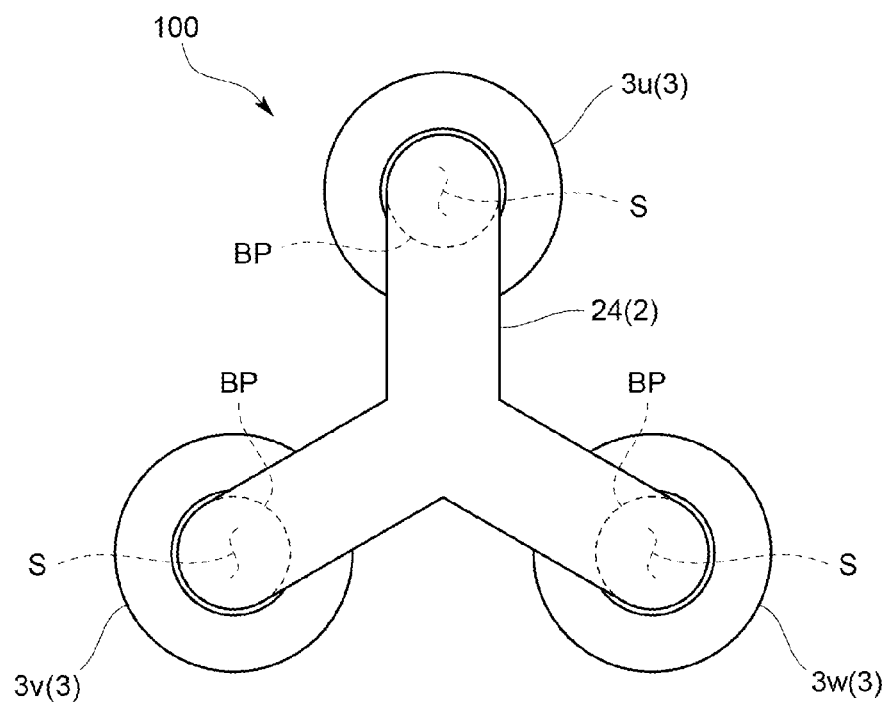
FIG. 7a is a plan view schematically illustrating a configuration of a spinning pack heating device according to a third embodiment.
Figure 7B:
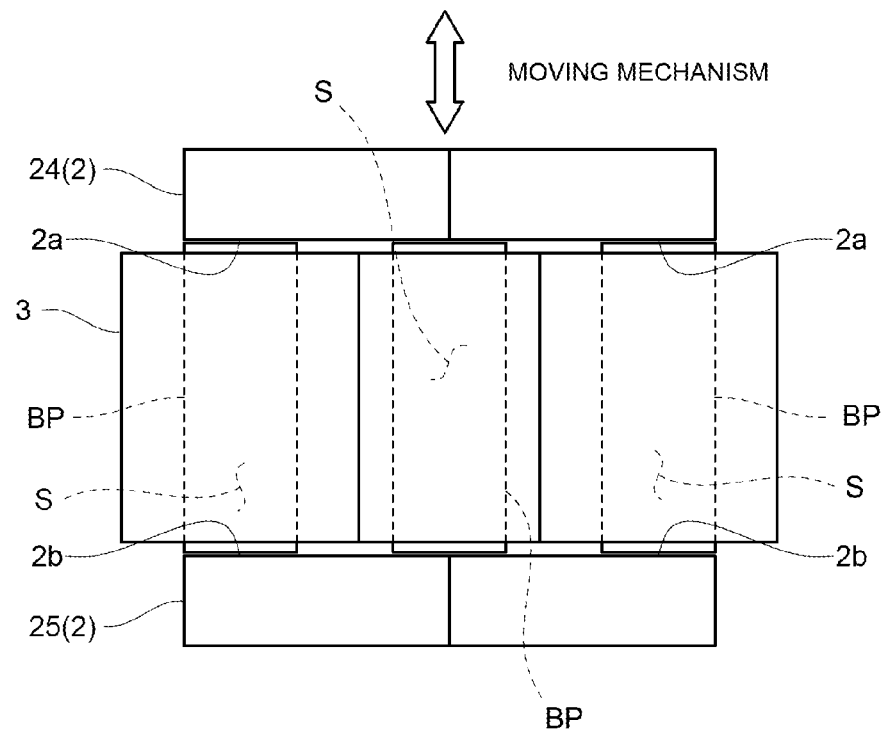
FIG. 7b is a cross-sectional view schematically illustrating the configuration of the spinning pack heating device according to the third embodiment.

As illustrated in FIGS. 7a and 7b, the magnetic path forming member 2 of the present embodiment includes a pair of magnetic path yoke cores 24 and 25 that form three spinning pack arrangement spaces S arranged at respective vertices of an equilateral triangle. Also, for the three spinning pack arrangement spaces S, magnetic flux generating windings $3u$, $3v$, and $3w$ are respectively provided. The three magnetic flux generating windings $3u$, $3v$, and $3w$ are connected with a three-phase AC power source (not illustrated).

According to the spinning pack heating device 100 of the third embodiment configured as described, the three spinning packs BP can be inductively heated at the same time. Also, by arranging the spinning packs BP in a triangular shape, magnetic circuit lengths of the three phases are equalized, and therefore magnetic resistances of the three phases can be equalized to equalize magnetic flux amounts respectively passing through the spinning packs BP. This enables the three spinning packs BP to be heated equally.

Figure 8A:
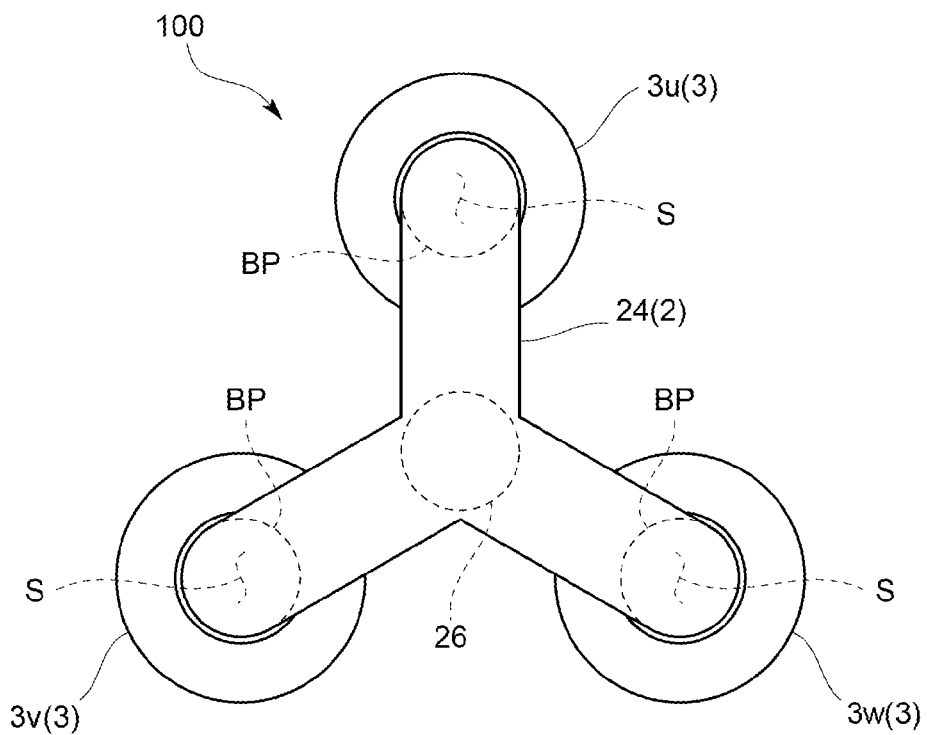
FIG. 8a is a plan view schematically illustrating a variation of the third embodiment.
Figure 8B:
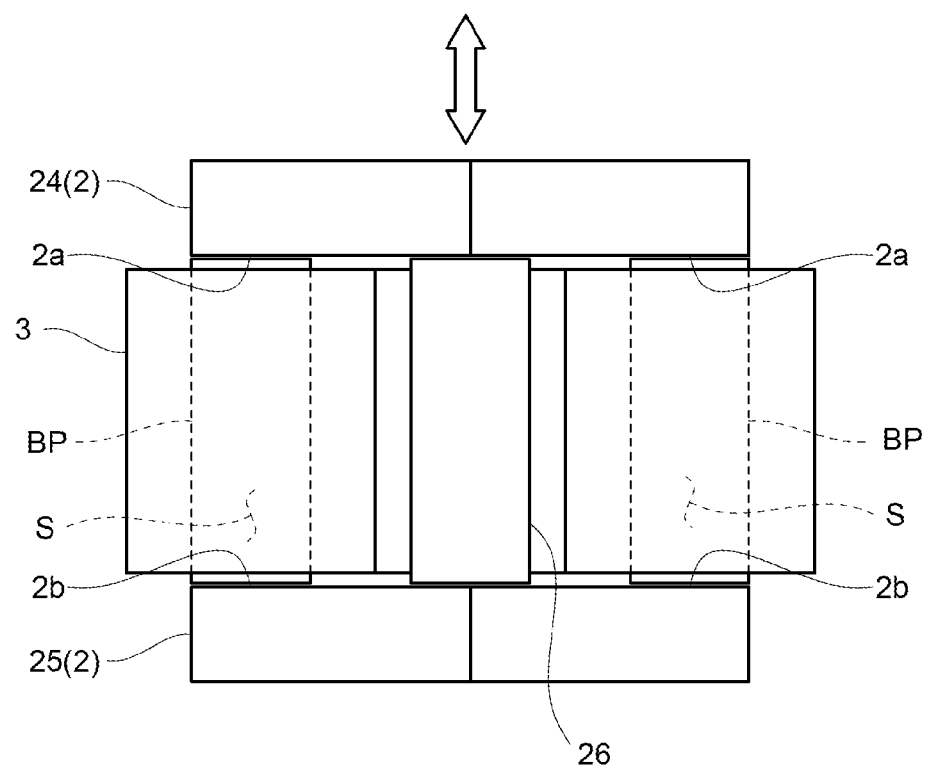
FIG. 8b is a cross-sectional view schematically illustrating a variation of the third embodiment.

Note that the present invention may be configured, in the spinning pack heating device 100 of the third embodiment, as illustrated in FIGS. 8a and 8b, to have: a leg core 26 that is provided at a gravity center position of the equilateral triangle formed by the three spinning pack arrangement spaces S and magnetically connects the magnetic path yoke cores 24 and 25 to each other; and a control mechanism (not illustrated) that individually controls currents flowing through the three magnetic flux generating windings 3u, 3v, and 3w. If so, the leg core 26 provided at the gravity center position of the equilateral triangle serves as a leg core for magnetic flux leakage, and therefore temperature rise values and heat-up times of the spinning packs BP arranged in the respective spinning pack arrangement spaces S can be individually controlled. Also, the number of spinning packs BP arranged in the three spinning pack arrangement spaces S can be set to one, two, or three to perform heating. Note that a cross-sectional area of a transverse cross section of the leg core 26 is substantially the same as a cross-sectional area of a transverse cross section of each of the magnetic path yoke cores 24 and 25.

(4) Fourth Embodiment

Next, a fourth embodiment of the present invention is described. Note that the same or corresponding members as those in each of the above-described embodiments are affixed with the same reference letters or numerals.

A spinning pack heating device 100 according to the fourth embodiment is different in arrangement of a magnetic flux generating winding 3 from the spinning pack heating device 100 of the first embodiment.

Figure 9:
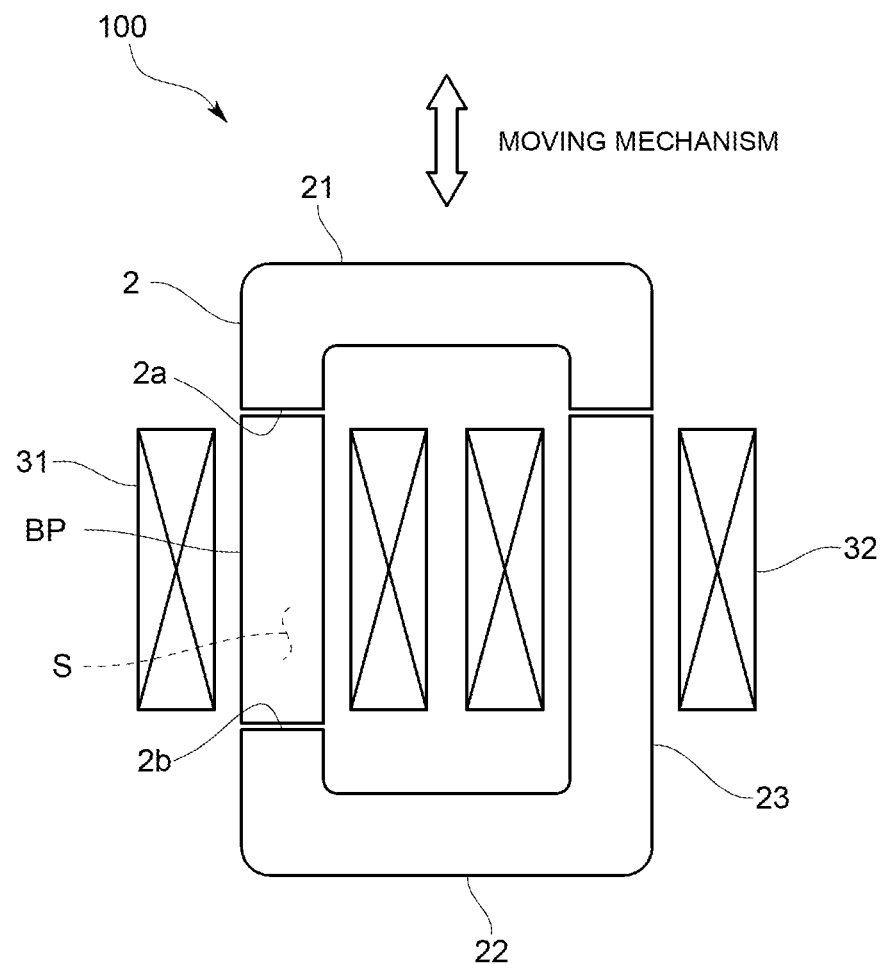
FIG. 9 is a cross-sectional view schematically illustrating a configuration of a spinning pack heating device according to a fourth embodiment.

As illustrated in FIG. 9, the spinning pack heating device 100 of the present embodiment has: a first magnetic flux generating winding 31 that is provided so as to be wound to surround a spinning pack arrangement space S; and a second magnetic flux generating winding 32 that is provided so as to be wound around part of a magnetic path forming member 2. Note that the first magnetic flux generating winding 31 is equivalent to the magnetic flux generating winding of the second embodiment, and the second magnetic flux generating winding 32 is equivalent to the magnetic flux generating winding of the first embodiment. Also, in the present embodiment, an upper core part 21 is configured to be vertically movable with respect to a leg core part 23 and a lower core part 22, and configured to be moved by the above-described moving mechanism.

The present embodiment is configured to be able to individually adjust magnetic flux amounts respectively generated by the first and second magnetic flux generating windings 31 and 32 by controlling values of currents to be made to flow through the windings 31 and 32. Specifically, the values of the currents to be made to flow through the first and second magnetic flux generating windings 31 and 32 are controlled by an unillustrated power source device.

Figure 10:
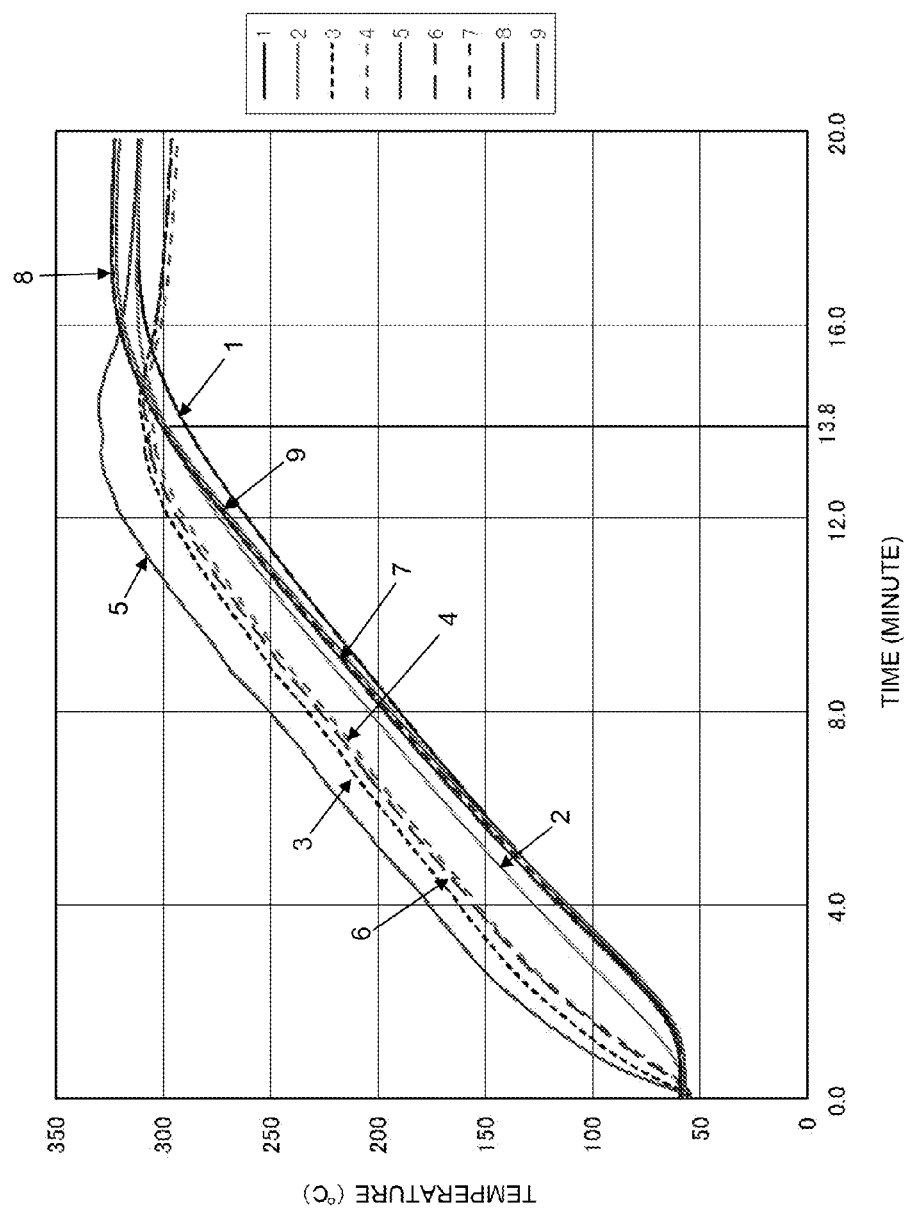
FIG. 10 is a diagram illustrating results of the induction heating test in the fourth embodiment.
Figure 11:
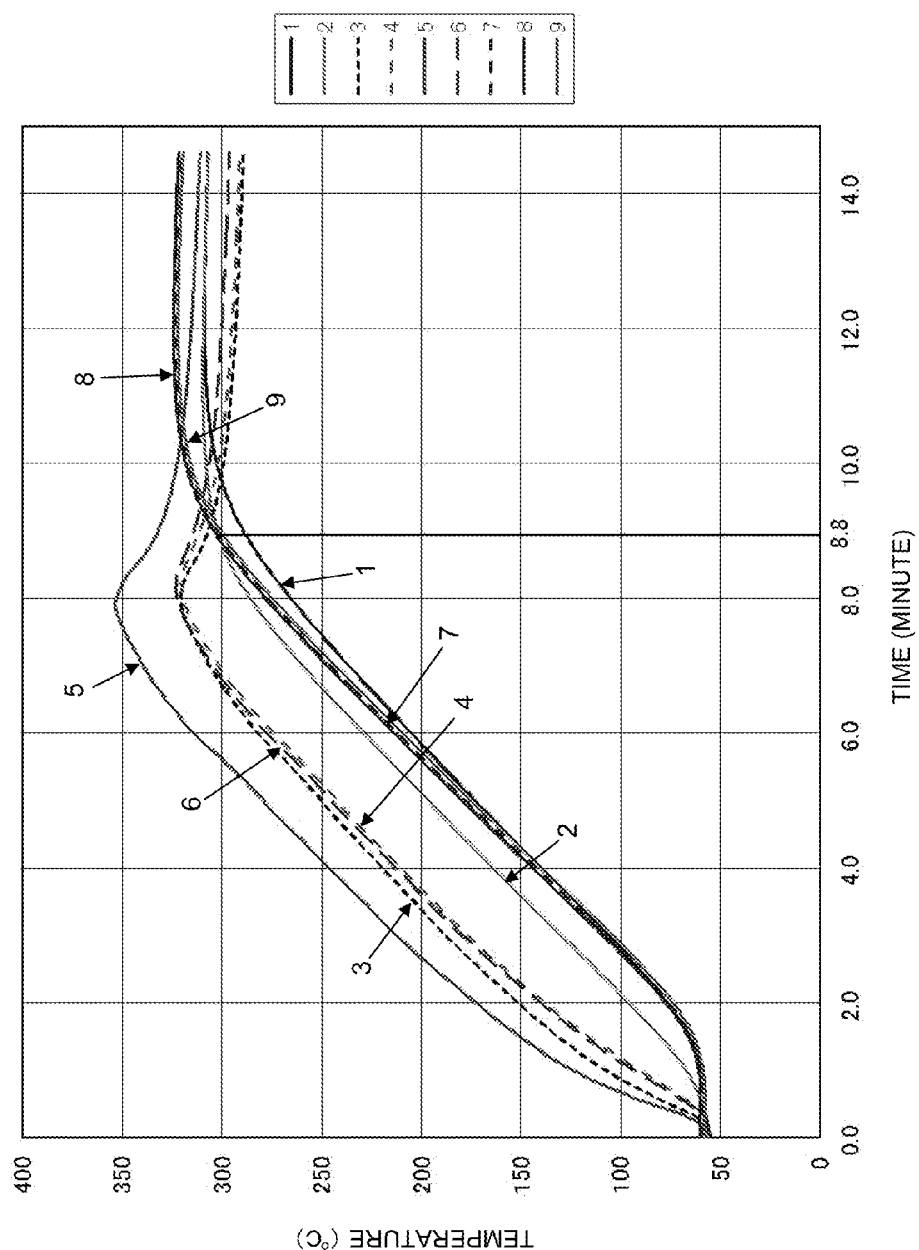
FIG. 11 is a diagram illustrating results of the induction heating test in the fourth embodiment.

Results of using the spinning pack heating device 100 of the present embodiment to inductively heat the test load in FIGS. 2a and 2b are listed in Tables 5 to 8 below and illustrated in FIGS. 10 and 11. This induction load test is a test under the condition that an electric capacity ratio between the first and second magnetic flux generating windings 31 and 32 is set to 1:0.85; Tables 5 and 6 and FIG. 10 represent results in the case of making an adjustment so as to meet the same capacity as that in the second embodiment; and Tables 7 and 8 and FIG. 11 represent results in the case of adjusting a heat-up time to the same as that in the second embodiment. Also, Tables 5 and 7 are tables listing changes in power factor and the like from the start; Tables 6 and 8 are tables listing changes in temperatures at the respective points with time; and FIGS. 10 and 11 are graphs illustrating the changes in temperatures at the respective points with time.

TABLE 5

| | First magnetic flux generating winding | | | | Second magnetic flux generating winding | | | |
|---|---|---|---|---|---|---|---|---|
| Temperature °C. | Voltage V | Current A | Capacity kW | Power factor | Voltage V | Current A | Capacity kW | Power factor |
| At start | 74.6 | 70.0 | 4.1 | 0.766 | 73.7 | 244.1 | 2.5 | 0.141 |
| 100 | 72.3 | 67.6 | 3.7 | 0.756 | 72.7 | 239.4 | 2.4 | 0.140 |
| 200 | 73.3 | 66.4 | 3.7 | 0.752 | 72.8 | 239.3 | 2.4 | 0.141 |
| 240 | 74.8 | 66.9 | 3.8 | 0.751 | 73.2 | 240.1 | 2.5 | 0.140 |

TABLE 6

| Elapsed time (minute) | Position | | | | | | | | | Temperature difference (°C.) |
|---|---|---|---|---|---|---|---|---|---|---|
| | 1 | 2 | 3 | 4 | 5 | 6 | 7 | 8 | 9 | |
| 2.6 | 82.4 | 97.2 | 137 | 126 | 150 | 128 | 82.3 | 84.2 | 80.2 | 69.8 |
| 13.8 | 289 | 298 | 309 | 305 | 329 | 307 | 299 | 300 | 298 | 40.1 |
| 15.8 | 307 | 311 | 304 | 302 | 321 | 305 | 319 | 320 | 318 | 18.6 |

TABLE 7

| | First magnetic flux generating winding | | | | Second magnetic flux generating winding | | | |
|---|---|---|---|---|---|---|---|---|
| Temperature °C. | Voltage V | Current A | Capacity kW | Power factor | Voltage V | Current A | Capacity kW | Power factor |
| At start | 87.4 | 74.5 | 4.9 | 0.753 | 86.8 | 317.1 | 3.9 | 0.143 |
| 100 | 86.8 | 71.6 | 4.7 | 0.761 | 86.4 | 313.0 | 3.9 | 0.143 |
| 200 | 91.9 | 71.3 | 4.7 | 0.717 | 91.3 | 339.9 | 4.4 | 0.143 |

TABLE 8

| Elapsed time (minute) | Position | | | | | | | | | Temperature difference (° C.) |
|---|---|---|---|---|---|---|---|---|---|---|
| | 1 | 2 | 3 | 4 | 5 | 6 | 7 | 8 | 9 | |
| 6.0 | 205 | 229 | 282 | 274 | 315 | 278 | 212 | 214 | 209 | 109.7 |
| 8.8 | 286 | 300 | 309 | 313 | 335 | 316 | 299 | 301 | 297 | 48.7 |
| 10.2 | 304 | 309 | 298 | 301 | 321 | 305 | 319 | 320 | 318 | 23.0 |

It turns out that in both FIGS. 10 and 11, a maximum temperature difference among the respective points of the test load takes a value equal to or less than that in the second embodiment, and the value can be adjusted between those in the first and second embodiments.

According to the spinning pack heating device 100 of the fourth embodiment configured as described, the magnetic flux amounts generated by the first and second magnetic flux generating windings 31 and 32 can be adjusted to adjust amounts of heat generation of the inside and outer circumferential part of a spinning pack BP, and therefore temperature differences among the respective points of the spinning pack BP can be controlled to a desired temperature or less.

(5) Fifth Embodiment

A spinning pack heating device 100 according to a fifth embodiment is one that inductively heats a spinning pack BP, which is fitted in a melt spinning apparatus, to a desired temperature.

Figure 12:
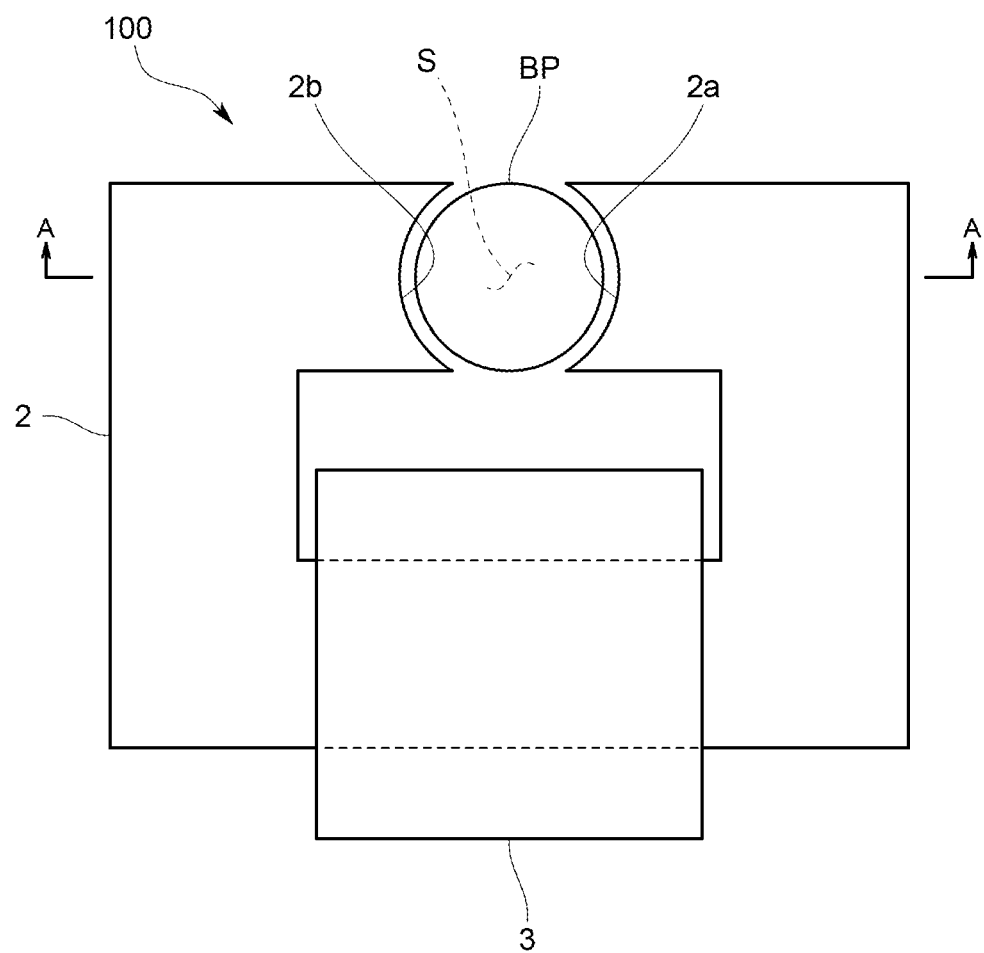
FIG. 12 is a plan view schematically illustrating a configuration drawing of a melt spinning apparatus installed with a spinning pack heating device according to a fifth embodiment.
Figure 13:
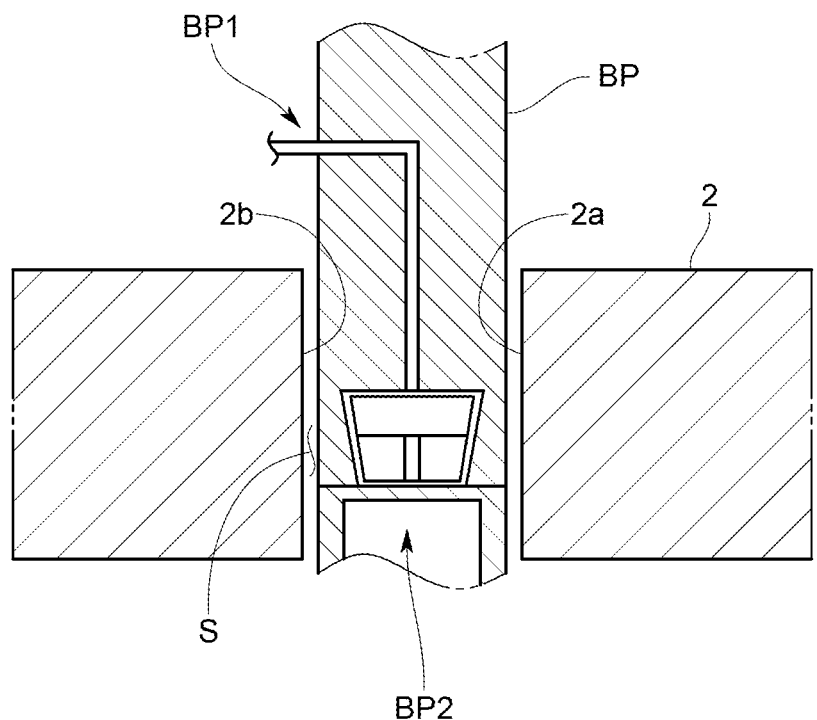
FIG. 13 is a partial cross-sectional view along an A-A line in the fifth embodiment.

Specifically, the spinning pack heating device 100, as illustrated in FIGS. 12 and 13, is provided with: the spinning pack BP having a resin inflow port BP1 into which molten resin flows and a discharge port BP2 that discharges spun yarn; a magnetic path forming member 2 that is provided with part of the spinning pack BP arranged to occupy the space and be positioned intermediate respective ends of the magnetic path forming member that border the space, which excludes the resin inflow port BP1 and the discharge port BP2; and a magnetic flux generating winding 3 that is provided so as to be wound around part of the magnetic path forming member 2.

Two opposite surfaces 2a and 2b forming a spinning pack arrangement space S of the magnetic path forming member 2 are respectively formed into partial arc shapes along an outer circumferential surface of the spinning pack BP, which causes the spinning pack arrangement space S, which is formed in a substantially cylindrical shape, to be formed. Note that the resin inflow port BP1 and discharge port BP2 of the spinning pack BP are configured not to interfere with any of the two opposite surfaces 2a and 2b. In more detail, in a lower surface of the spinning pack BP, the discharge port BP2 is formed, whereas in an upper part of the outer circumferential surface of the spinning pack BP, the resin inflow port BP1 is formed, and therefore the two opposite surfaces 2a and 2b are positioned on a lower side of the resin inflow port BP1 in the outer circumferential surface of the spinning pack BP.

According to the spinning pack heating device 100 of the fifth embodiment configured as described, magnetic flux generated by the magnetic flux generating winding 3 passes through the magnetic path forming member 2 to penetrate through the whole of the part of the spinning pack BP intervening between the two opposite surfaces 2a and 2b, and therefore the whole of the intervening part of the spinning pack BP can be heated by eddy currents to uniformly heat the whole of the part of the spinning pack BP intervening between the two opposite surfaces 2a and 2b. This enables the inside of the spinning pack BP to be heated in a short period of time while keeping temperature of an outer circumferential part of the spinning pack BP less than the maximum allowable temperature.

Figure 14:
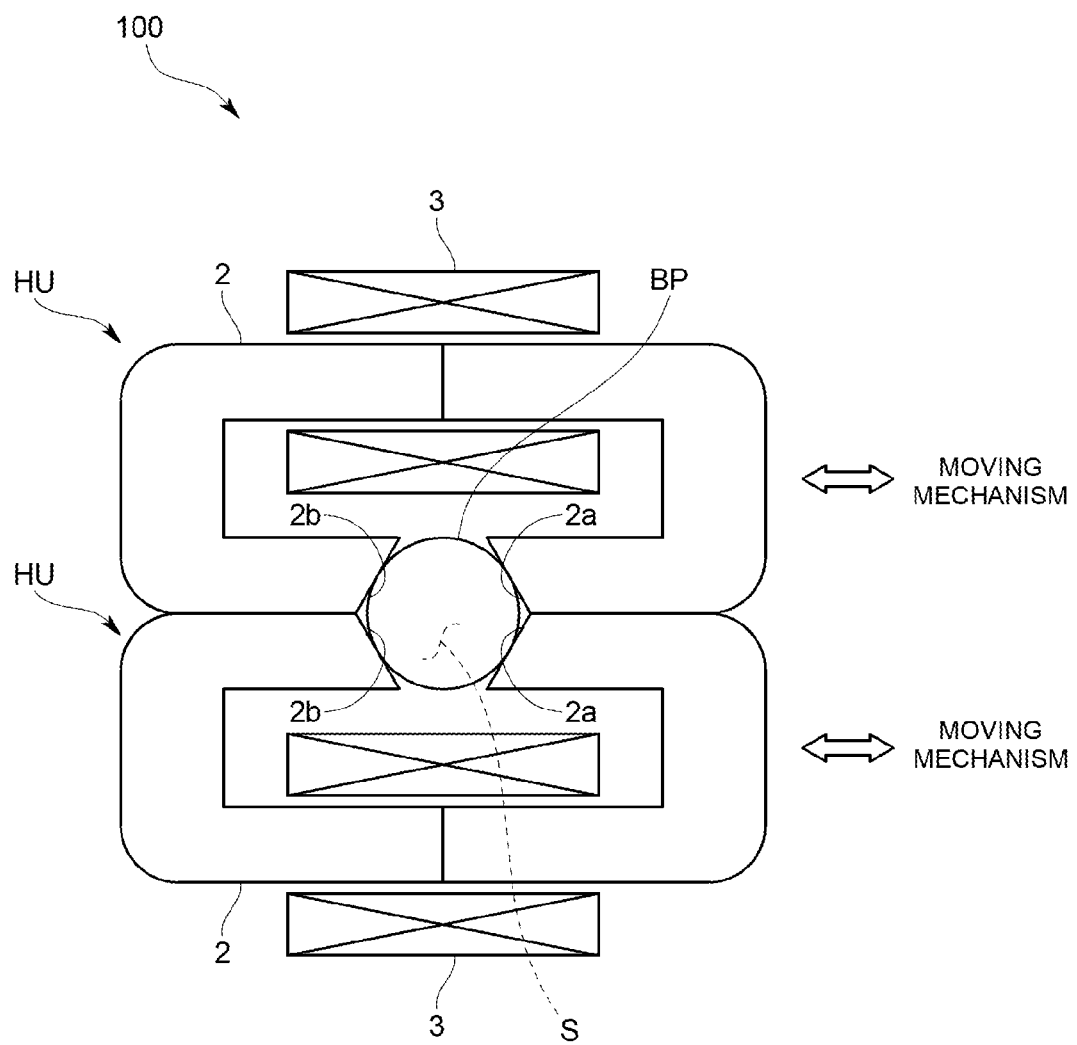
FIG. 14 is a plan view schematically illustrating a variation of the fifth embodiment.

In addition, the spinning pack heating device 100 of the fifth embodiment is configured to include the one magnetic path forming member 2 and the one magnetic flux generating winding 3; however, as illustrated in FIG. 14, the present invention may be configured to heat one spinning pack BP with use of two heating units HU each configured to include one magnetic path forming member 2 and one magnetic flux generating winding 3. In this case, spinning pack arrangement spaces S of the respective heating units HU form one arrangement space where the one spinning pack BP is arranged. Also, two opposite surfaces 2a and 2b constituting the spinning pack arrangement space S of each of the heating units HU are obliquely linearly formed, and by combining the two heating units HU, substantially doglegged opposite surfaces are formed with the spinning pack BP arranged therein. This causes the two sets of opposite surfaces 2a and 2b of the two heating units HU to come into contact with or come close to the spinning pack BP at four points. In addition, in this case, the magnetic path forming member 2 of each of the heating units HU can be separated into two parts and, by moving one of the two parts of each of the heating units HU by an unillustrated moving mechanism, attachment/detachment of the spinning pack BP is facilitated.

Furthermore, it should be appreciated that the present invention is not limited to any of the above-described embodiments, but can be variously modified without departing from the scope thereof.

REFERENCE CHARACTERS LIST

100: Spinning pack heating device
BP: Spinning pack
2: Magnetic path forming member
S: Spinning pack arrangement space
3: Magnetic flux generating winding

The invention claimed is:

1. A spinning pack heating device that preheats a spinning pack by induction heating, the spinning pack heating device comprising:
   a magnetic path forming member that forms a magnetic path with a spinning pack arrangement space where the spinning pack is arranged intervening between respective ends of the magnetic path forming member that border the space; and
   a magnetic flux generating winding that is provided so as to be wound to surround the spinning pack arrangement space, wherein:
   the magnetic path forming member includes a pair of magnetic path yoke cores that form three spinning pack arrangement spaces arranged at respective vertices of an equilateral triangle;
   the magnetic flux generating winding is one of three magnetic flux generating windings, a respective one of the three magnetic flux generating windings being provided for each of the three spinning pack arrangement spaces; and the three magnetic flux generating windings are connected to a three-phase AC power source.

2. The spinning pack heating device according to claim 1, having:

a leg core that is provided at a gravity center position of the equilateral triangle formed by the three spinning pack arrangement spaces and that magnetically connects the paired magnetic path yoke cores to each other; and a control mechanism that individually controls currents flowing through the three magnetic flux generating windings.

* * * * *